(12) United States Patent
Staudt et al.

(10) Patent No.: US 7,213,341 B2
(45) Date of Patent: May 8, 2007

(54) DEVICE FOR DETERMINING AN ABSOLUTE ANGLE OF ROTATION

(75) Inventors: Norbert Staudt, Aschaffenburg (DE); Volker Stegmann, Aschaffenburg (DE); Guido Hirzmann, Sailauf (DE); Klaus Weigand, Steinau (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 11/230,014

(22) Filed: Sep. 19, 2005

(65) Prior Publication Data
US 2006/0059698 A1 Mar. 23, 2006

(30) Foreign Application Priority Data
Sep. 23, 2004 (DE) ............... 20 2004 014 849 U

(51) Int. Cl.
*G01B 7/30* (2006.01)
(52) U.S. Cl. .................. 33/1 PT; 324/207.25
(58) Field of Classification Search ............... 33/1 N, 33/1 PT, 534; 324/207.24, 207.25
See application file for complete search history.

(56) References Cited

U.S. PATENT DOCUMENTS 5,060,592 A * 10/1991 Stock ................... 33/1 N
6,246,232 B1 * 6/2001 Okumura ............... 324/207.25
2002/0053903 A1 5/2002 Kempe
2002/0118013 A1 * 8/2002 Kowalski et al. ....... 324/207.25
2005/0030012 A1 2/2005 Kunz-Vizenetz
2005/0116705 A1 * 6/2005 Breuer et al. .......... 324/207.25
2005/0127901 A1 * 6/2005 Johnson ................ 324/207.25
2005/0217126 A1 * 10/2005 Inoue ..................... 33/1 PT

FOREIGN PATENT DOCUMENTS

| DE | 3907442 | 9/1990 |
|---|---|---|
| DE | 4038674 | 6/1992 |
| DE | 10334869 | 9/2004 |
| DE | 10349556 | 6/2005 |
| EP | 1202025 | 5/2002 |

* cited by examiner

*Primary Examiner*—G. Bradley Bennett
(74) *Attorney, Agent, or Firm*—Tarolli, Sundheim, Covell & Tummino LLP

(57) ABSTRACT

A device for determining an absolute angle of rotation of a rotational axis has a first measuring device for measuring an angle of rotation in a limited first measuring range and a second measuring device for determining an absolute angle range. The second measuring device transforms a rotation of the rotational axis into a linear shift.

8 Claims, 2 Drawing Sheets

DEVICE FOR DETERMINING AN ABSOLUTE ANGLE OF ROTATION

TECHNICAL FIELD

The present invention relates to a device for determining an absolute angle of rotation of a rotational axis.

BACKGROUND OF THE INVENTION

A device for determining an absolute angle of rotation of a rotational axis having a first measuring device for measuring an angle of rotation in a limited first measuring range and a second measuring device for determining an absolute angular range is known from DE 198 18 799 A1. The first measuring device includes two magnetic pole rings. The pole rings are arranged on the rotational axis and have north and south poles arranged circumferentially in alternating series. The rings have a different number of magnetic poles. A fixed magnetoresistive sensor is associated with each ring. Using this arrangement, it is indeed possible to determine an angle of rotation at a very high resolution, but only in a range from 0° to a maximum 180°. Therefore, DE 198 18 799 A1 proposes a second measuring device that has a Hall sensor and that, in contrast to the magnetoresistive sensors, makes it possible to determine the actual polarity of a measured magnetic pole. In this way, it is possible to expand the range of the absolute angle measurement to an interval ranging from 0° to 360°. However, to determine the absolute angle of rotation of a steering wheel, which can execute several rotations in both directions, this is still insufficient.

It is an object of the present invention to provide a device which is able to determine an absolute angle of rotation at a high resolution over a large measuring range.

BRIEF SUMMARY OF THE INVENTION

The device for determining an absolute angle of rotation of a rotational axis according to the invention has a first measuring device for measuring an angle of rotation in a limited first measuring range and a second measuring device for determining an absolute angle range. The second measuring device transforms a rotation of the rotational axis into a linear shift. In this way, it is possible to easily measure even angles of rotation that are greater than 360°, corresponding to more than one rotation of the rotational axis, without requiring an incremental signal evaluation (counting of the rotations or the like). Transforming the rotation into a linear shift has the advantage that the shift is continuous and does not repeat itself as a rotation does beyond 360°. Thus, with an appropriate arrangement a sufficient number of rotations can be transformed in linear fashion, so that the entire range for the angle of rotation of a steering wheel can be measured. In combination with a first measuring device, such as is known from DE 198 18 799 A1, a cost-effective device is provided, which can determine the absolute angle of rotation of a steering wheel immediately after turning on the supply voltage of the motor vehicle without a relative motion of the electrical components being required. The measurement can be carried out without contact and at high resolution.

The transformation of the rotation into a linear shift can be achieved in accordance with a preferred embodiment of the present invention in that the second measuring device includes a spiral-shaped connecting link guide in a rotor that is coupled to the rotational axis. In this regard, the second measuring device preferably includes a measuring unit that can be shifted radially and has a shift element engaging in the connecting link guide. This arrangement assures that a rotation of the rotational axis leads to a linear shift of the measuring unit corresponding to the rotation.

In the case of a motor vehicle steering wheel, it is expedient that the spiral-shaped connecting link guide has a number of 360° windings which corresponds to at least the number of rotations that can be executed by the rotational axis (in this case, the steering column).

For measuring the linear shift, it is advantageous to have a design in which the second measuring device includes a bar magnet that extends in the radial direction and a magnetic field sensor that is arranged opposite the bar magnet, the bar magnet, or the magnetic field sensor, being arranged on the shiftable measuring unit, and the magnetic field sensor, or the bar magnet, respectively, being arranged in stationary fashion. The magnetic field sensor is preferably a magnetoresistive sensor.

A device according to the present invention in which the first measuring device includes at least two pole rings coupled to the rotational axis and having a different number of magnetic poles, the first measuring device further including two magnetoresistive sensors that associated with the pole rings, makes possible a reliable measurement of the angle of rotation even at high angular velocities.

DETAILED DESCRIPTION OF THE PREFERRED EMBODIMENT

The present invention is described in greater detail below on the basis of a device for measuring a steering wheel angle.

Figure 1:
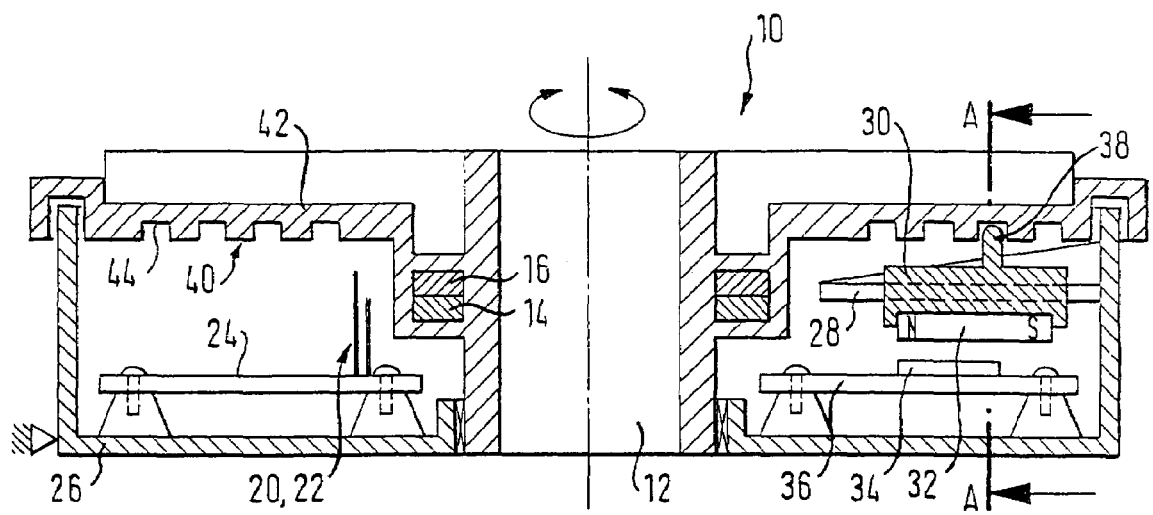
FIG. 1 depicts a sectional view of a device according to the invention.

Device 10, depicted in FIG. 1, functions to determine the absolute steering wheel angle of rotation in a motor vehicle. The steering wheel (not shown) is coupled non-rotatably to a rotational axis 12 (the steering column). It is possible for the rotational axis to execute several rotations in both directions starting from an initial position (a central position of the steering wheel).

Figure 2:
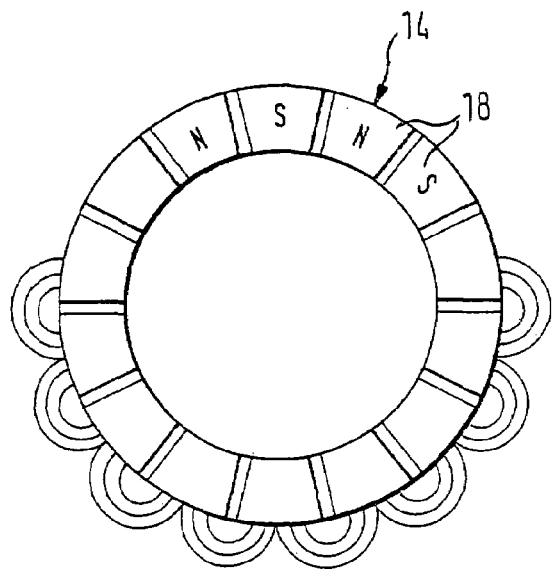
FIG. 2 depicts a top view of a pole ring of the device according to the invention.

A first measuring device is constructed in the following manner. Two pole rings 14, 16 are concentrically arranged axially one over the other and are attached to rotational axis 12. The first pole ring 14 is depicted in FIG. 2. Pole ring 14 is composed of a plurality of magnetized segments 18, so that in the circumferential direction the north and south poles are placed in alternating series. Second pole ring 16 is designed identically to first pole ring 14, but it has a different number of magnetic poles than first pole ring 14. Arranged radially opposite pole rings 14, 16 on a circuit board 24 are two magnetoresistive sensors 20, 22. Circuit board 24, in turn, is attached to a support 26 that is stationary with respect to rotational axis 12.

Figure 3:
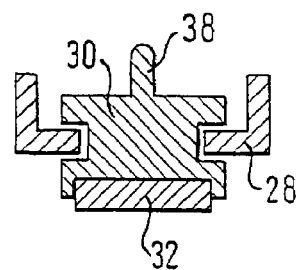
FIG. 3 depicts a detail view along the line A—A in FIG. 1.

A slider 30, that is depicted in greater detail in FIG. 3, is supported in sliding fashion on a radial arm 28 of fixed support 26. A radially oriented bar magnet 32 is attached on the lower side of slider 30. Positioned opposite bar magnet 32 is a further magnetic field sensor 34, preferably a magnetoresistive sensor. Sensor 34 is arranged on a fixed circuit board 36, which can be the same circuit board as the one on which other magnetic field sensors 20, 22 are arranged, or it can be a separate circuit board.

Figure 4:
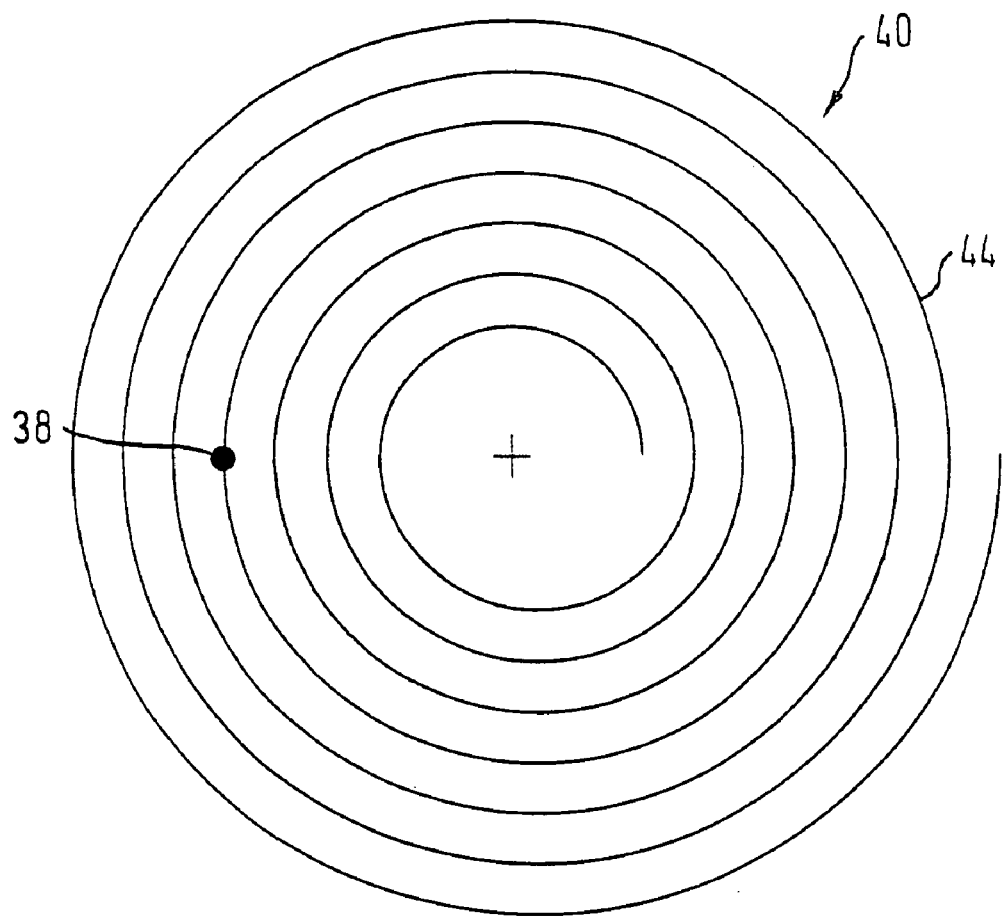
FIG. 4 depicts a connecting link guide of the device according to the invention.

An extension 38 is molded on the upper side of slider 30. Extension 38 engages in a connecting link guide 40, which is formed in a section of a rotor 42 that is coupled, and runs perpendicular, to rotational axis 12. Rotor 42, as depicted in FIG. 1, can also function as support for pole rings 14, 16 and/or can be designed so as to be an integral part of rotational axis 12. Connecting link guide, which is depicted in a top view in stylized fashion in FIG. 4, includes a spiral groove 44, which, in the embodiment depicted, has a total of seven 360° windings. The number of 360° windings of spiral groove 44 corresponds to the number of complete rotations that the steering wheel can execute. In the initial position of rotational axis 12, i.e., in the central position of the steering wheel, extension 38 is located in a position that corresponds precisely to the halfway point of the overall length of spiral groove 40.

The first measuring device can measure an angle of rotation in a contactless manner in a measuring range of 0° to 180° at an extremely high level of precision. The second measuring device can resolve a sufficient number of 180° angle ranges to cover the entire rotational range of the steering wheel. Determining the absolute steering wheel angle of rotation is then accomplished by combining the measurement results of the first and the second measuring device.

On the one hand, the first measuring device determines which of segments 18 of pole rings 14, 16 are opposite magnetoresistive sensors 20, 22. This is carried out with the assistance of the phase shift of the sensor signals, which is generated by the different numbers of segments in pole rings 14, 16. On the other hand, a precise angle measurement is carried out within the segment range in question through an evaluation of the sine and cosine signals of the sensors with the assistance of the arc-tangent function.

To be able to indicate the actual absolute steering wheel angle of rotation, it is necessary to know the current 180° angle range in which the angle lies that is measured by the first measuring device. For this purpose, the second measuring device is used, which, depending on the total number of rotations that the steering wheel can execute, must resolve double the number of 180° angle ranges. In the case of a steering wheel that can execute three and a half rotations in both directions (i.e., a total of seven 360° rotations), this results in fourteen 180° angle ranges, and in the case of four rotations in both directions, a corresponding sixteen 180° angle ranges.

As was already mentioned, extension 38 of slider 30, which can be shifted in linear fashion, is situated in the central position of the steering wheel at a location that corresponds precisely to the halfway point of the overall length of spiral groove 44 in rotor 42. In response to a rotation of the steering wheel and of rotor 42, which is coupled non rotatably to the steering wheel, slider 30 is moved radially to the inside or to the outside in spiral groove 44 by the positive guide of extension 38, which functions as a shift element. In this way, the rotation of the steering wheel brings about a linear shift of slider 30. The direction and the extent of this shift can be measured in a contactless manner using magnetoresistive sensor 34. Magnetoresistive sensor 34 measures the magnetic field lines of bar magnet 32, which is attached to slider 30. The extent of the linear shift can be appropriately adjusted by the selection of the pitch of the spiral windings.

Figure 5:
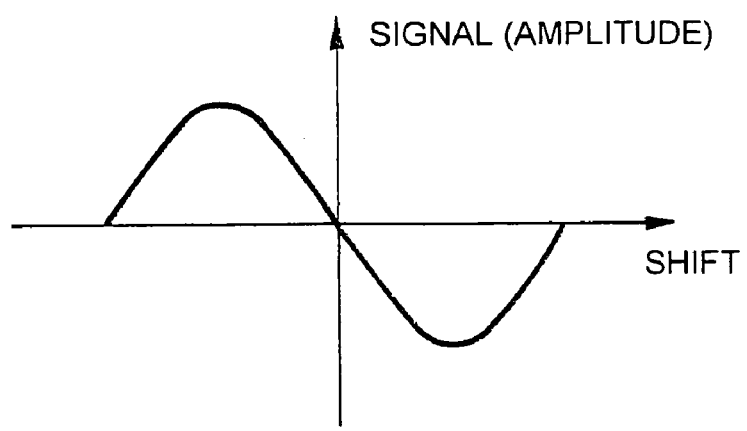
FIG. 5 depicts a signal curve of the second measuring device of the device according to the invention.

FIG. 5 depicts an exemplary signal curve, output by magnetoresistive sensor 34 in response to a linear shift of bar magnet 32. From the sensor signal, it is possible then to conclude the current 180° angle range in which the angle of rotation lies that is measured by the first measuring device.

The invention claimed is:

1. A device for determining an absolute angle of rotation of a rotational axis, the device having a first measuring device for measuring an angle of rotation in a limited first measuring range, and a second measuring device for determining an absolute angle range, wherein the second measuring device transforms a rotation of the rotational axis into a linear shift, the second measuring device including a measuring unit that can be shifted radially.

2. The device as recited in claim 1, wherein the second measuring device includes a spiral-shaped connecting link guide in a rotor that is coupled to the rotational axis.

3. The device as recited in claim 2, wherein the measuring unit has a shift element engaging in the connecting link guide.

4. The device as recited in claim 2, wherein the spiral-shaped connecting link guide has a number of 360° windings which corresponds to at least the number of the rotations that can be executed by the rotational axis.

5. The device as recited in claim 3, wherein the second measuring device has a bar magnet that extends in the radial direction and a magnetic field sensor that is arranged opposite the bar magnet, one of the bar magnet and the magnetic field sensor being arranged on the shiftable measuring unit, and the other of the bar magnet and the magnetic field sensor being arranged in stationary fashion.

6. The device as recited in claim 5, wherein the magnetic field sensor is a magnetoresistive sensor.

7. The device as recited in claim 1, wherein the first measuring device includes at least two pole rings coupled to the rotational axis and having a different number of magnetic poles, the first measuring device further including two magnetoresistive sensors associated with the pole rings.

8. The device as recited in claim 1, wherein the second measuring device includes a radially extending spiral-shaped connecting link guide in a rotor that is coupled to the rotational axis that engages a shift element of the measuring unit engaging in the connecting link guide.

* * * * *